United States Patent

Nakano et al.

[11] Patent Number: 5,277,327
[45] Date of Patent: Jan. 11, 1994

[54] RESERVOIR CAP HAVING A SEALING MEMBER

[75] Inventors: Toshihiro Nakano, Chiryu; Shinji Sakata, Nishio, both of Japan

[73] Assignee: Aisin Seiki Kabushiki Kaisha, Kariya, Japan

[21] Appl. No.: 873,208

[22] Filed: Apr. 24, 1992

[30] Foreign Application Priority Data

Apr. 24, 1991 [JP] Japan .................................. 3-94329

[51] Int. Cl.⁵ .......................................... B65D 53/00
[52] U.S. Cl. .................................. 220/304; 220/209; 220/303; 220/373; 220/374; 277/206 A; 277/206 R; 60/585; 60/592
[58] Field of Search ............... 220/303, 304, 373, 374, 220/378, 220/DIG. 32, DIG. 33; 60/585, 592; 277/206.A, 206.1, 206R

[56] References Cited

U.S. PATENT DOCUMENTS

| | | | |
|---|---|---|---|
| 2,700,561 | 1/1955 | Svenson | 277/206 A X |
| 3,052,478 | 9/1962 | Horvereid | 277/206 A X |
| 3,312,149 | 4/1967 | Fleckenstein et al. | 272/206.1 |
| 4,500,761 | 2/1985 | Kubota et al. | 60/585 X |
| 4,514,984 | 5/1985 | Kubota . | |
| 4,602,482 | 7/1986 | Kubota et al. | |
| 5,002,290 | 3/1991 | Pernin | 277/206 A |
| 5,022,713 | 6/1991 | Pugh et al. | 60/592 X |
| 5,072,844 | 12/1991 | Nakano et al. | |
| 5,183,173 | 2/1993 | Heekman | 220/367 |

FOREIGN PATENT DOCUMENTS

| | | | |
|---|---|---|---|
| 851707 | 8/1952 | Fed. Rep. of Germany | 277/206.1 |
| 1185726 | 8/1959 | France | 277/206.1 |
| 1351107 | 3/1963 | France | 277/206.1 |
| 58-158746 | 10/1983 | Japan . | |
| 61-16445 | 5/1986 | Japan . | |
| 61-31588 | 9/1986 | Japan . | |
| 63-8528 | 3/1988 | Japan . | |
| 63-192175 | 12/1988 | Japan . | |
| 1-60971 | 4/1989 | Japan . | |
| 2-124370 | 10/1990 | Japan . | |
| 2-126969 | 10/1990 | Japan . | |
| 2-127582 | 10/1990 | Japan . | |
| 2-128673 | 10/1990 | Japan . | |
| 305783 | 11/1968 | Sweden | 277/206 A |

*Primary Examiner*—Stephen P. Garbe
*Assistant Examiner*—Stephen Cronin
*Attorney, Agent, or Firm*—Oblon, Spivak, McClelland, Maier & Neustadt

[57] ABSTRACT

The present invention is directed to a cap assembly for screwing into an opening of a reservoir for storing a fluid therein. Around the cap, formed is a sealing groove in which a sealing member is disposed. The sealing member has a sealing portion which extends toward the inner periphery of the opening, and a pair of contacting portions which extend axially toward each inner side of the sealing groove in spaced relationship with each inner side of the sealing groove by a predetermined clearance respectively. The sealing member is formed around the periphery thereof with grooves for allowing the sealing portion and contacting portions to be deflected in response to a sliding motion of the sealing member when the cap assembly is screwed into the opening.

9 Claims, 2 Drawing Sheets

RESERVOIR CAP HAVING A SEALING MEMBER

BACKGROUND OF THE INVENTION

1. Field of the Invention

The present invention relates to a reservoir cap for use in a braking system, clutch system or the like, more particularly to a reservoir cap having a sealing member suitable to fluid-tightly cap the openings of reservoirs for various liquid operated machines.

2. Description of the Prior Art

In Japanese Utility Model Laid-open Publication No. 58-158746, there is disclosed a cap assembly which closes an opening of a reservoir for storing a braking fluid, and which is provided with an annular sealing member having a circular cross section.

According to the above-described prior art, however, in order to provide an effective seal between the cap assembly and the reservoir, it is necessary to enlarge the diameter of the sealing member for example, to thereby strengthen a pressing force between the sealing member and the reservoir, i.e., enlarge an interference therebetween, since the annular sealing member has the circular cross section. Consequently, when the cap assembly is disposed on the reservoir, the sliding resistance between the sealing member and the reservoir increases to impair a fitting ability of the cap assembly.

SUMMARY OF THE INVENTION

Accordingly, it is an object of the present invention to provide a reservoir cap having a sealing member for providing an effective seal between a reservoir and a cap assembly and reducing a sliding resistance therebetween.

In accomplishing the above and other objects, a cap assembly according to the present invention comprises a cap member for closing an opening, and a cylindrical member connected to the cap member for threadedly engaging with the opening. The cylindrical member is formed therearound with a sealing groove opened outwardly and radially. A sealing member is disposed in the sealing groove of the cylindrical member, and formed with a sealing portion extending radially around the outer periphery of the sealing member, and a pair of contacting portions extending in the axial direction of the cylindrical member in spaced relationship with each inner side of the sealing groove of the cylindrical member by a predetermined clearance respectively.

Preferably, the sealing member is formed on both sides thereof adjacent to the contacting portions respectively with annular grooves which is opened axially to radially deflect the contacting portions in response to a sliding motion of the sealing member on the inner surface of the opening.

The sealing member may be formed further with engaging lips around the inner periphery of the sealing member at both ends thereof effective to engage with the side surfaces and the bottom of the sealing groove.

BRIEF DESCRIPTION OF THE DRAWINGS

The above stated object and following description will become readily apparent with reference to the accompanying drawings in which.

DESCRIPTION OF THE PREFERRED EMBODIMENT

Figure 1:
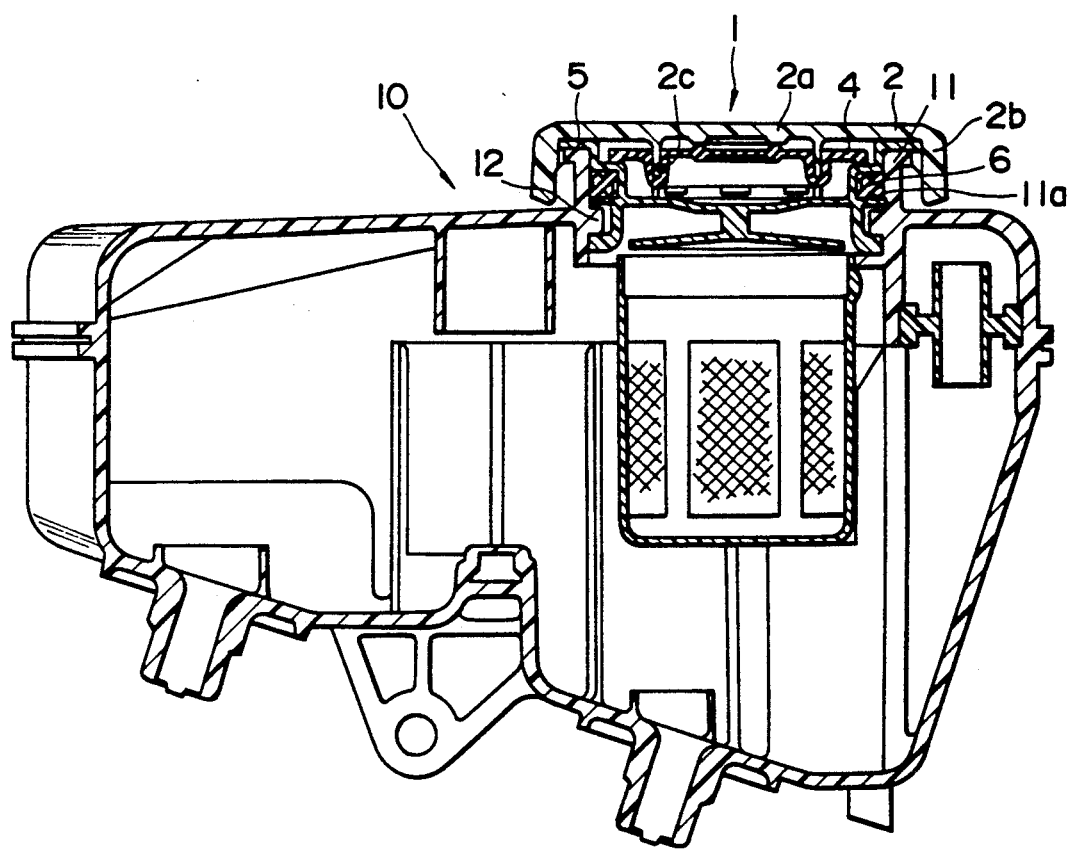
FIG. 1 is a sectional view of a reservoir provided with a cap assembly according to an embodiment of the present invention.
Figure 2:
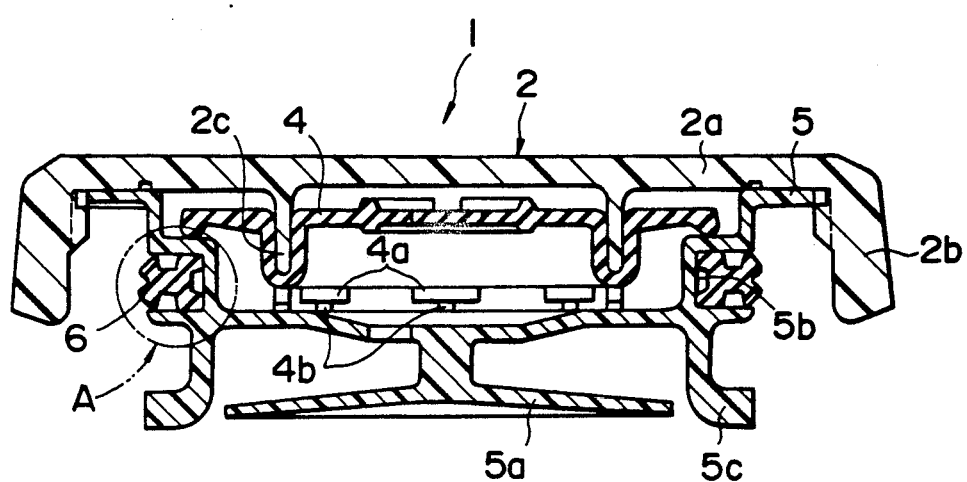
FIG. 2 is a sectional view of a cap assembly according to an embodiment of the present invention.

Referring to FIG. 1, there is illustrated a reservoir 10 in which working fluid is stored and which is connected to a master cylinder (not shown). FIG. 2 illustrates a cap assembly 1 which is screwed into an opening 11 (shown in FIG. 1) of the reservoir 10 to close it fluid-tightly. The cap assembly 1 includes a cap member 2 having a planar portion 2a and a cylindrical portion 2b for manually grasping it. From the reverse surface of the planar portion 2a, an annular protuberant portion 2c extends toward the reservoir 10. A diaphragm 4 is fitted into the protuberant portion 2c. A deflector 5 is secured to the cap member 2 at the inside thereof so that the diaphragm 4 is clamped between the cap member 2 and the deflector 5. There are formed a plurality of protrusions 4a, 4b on the diaphragm 4 around the annular portion thereof fitted into the protuberant portion 2c to provide a clearance between the annular portion and the deflector 5.

The deflector 5 is a cylindrical member provided with a disk-like antifoaming plate 5a which extends downwardly toward the reservoir 10. The antifoaming plate 5a prevents the fluid stored in the reservoir 10 from flowing out of the reservoir 10 due to slushing and bubbling of the fluid. Around the outer periphery of a side wall of the deflector 5, are formed an annular sealing groove 5b opened outwardly and an engaging portion 5c extending outwardly. The engaging portion 5c is arranged to threadedly engage with a threaded portion 12 which is formed around the inner periphery of the opening 11 of the reservoir 10 as shown in FIG. 1, and arranged to screw the cap member 2 into the reservoir 10. Fitted into the groove 5b is an annular sealing member 6 which is arranged to provide a fluid-tight seal between the cap assembly 1 and the reservoir 10 when the cap assembly 1 is screwed into the opening 11 of the reservoir 10.

Figure 3:
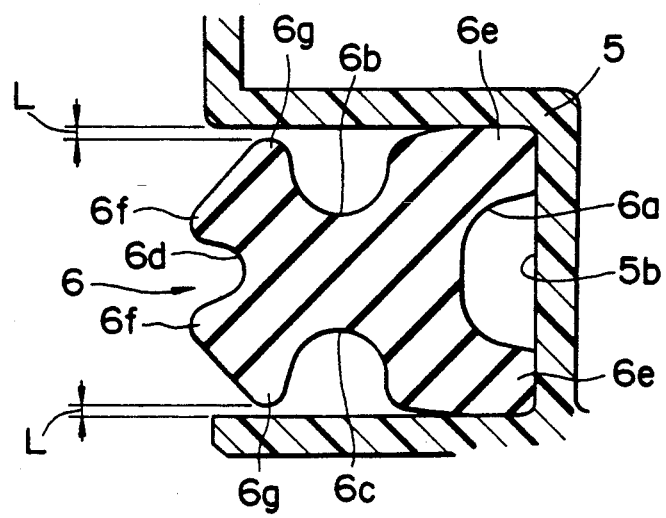
FIG. 3 is an enlarged sectional view of a portion encircled as indicated by A in FIG. 2.

Next will be described the annular sealing member 6, with reference to the enlarged sectional view of FIG. 3 as indicated by A in FIG. 2. The sealing member 6 is formed therearound with annular grooves 6a, 6b, 6c and 6d facing each other. And, the sealing member 6 is provided with engaging lips 6e, 6e which extend inwardly of the sealing member 6 to be fitted into and engaged with the groove 5b, sealing portions 6f, 6f which extend outwardly, and contacting portions 6g, 6g each of which is disposed in spaced relationship with each inner side surface of the groove 5b by a predetermined clearance L respectively.

Each sealing portion 6f is arranged to contact with an inner peripheral surface 11a (shown in FIG. 1) of the opening 11 of the reservoir 10, when the cap assembly 1 is screwed into the opening 11 of the reservoir 10 to provide an effective seal between the cap assembly 1 and the reservoir 10.

When the interference between the cap assembly 1 and the inner side surface 11a is extremely large, the sealing member 6 can be deflected until the contacting portion 6g contacts with the inner side surface of the groove 5b, i.e., deflected by a distance of the clearance L, to thereby maintain a desired interference and prevent a sliding resistance, which is caused when the cap assembly 1 is screwed into the reservoir 10, from being increased.

Since the sealing member 6 is formed with the grooves 6b-6d, it can be deflected toward the grooves 6b-6d when the interference is extremely large, so that the desired interference can be maintained, yet the sliding resistance is prevented from being increased. Further, when the sealing member 6 is manufactured and the opening 11 of the reservoir 10 is formed, the dimensional tolerance may be made large, so that the sealing member 6 is manufactured easily.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A cap assembly which may be installed for closing an opening having an inner peripheral surface, comprising:
    a cap member for closing the opening;
    a cylindrical member connected to said cap member for threadedly engaging with said opening, said cylindrical member being formed therearound with a sealing groove opened outwardly and radially; and
    a sealing member disposed in said sealing groove of said cylindrical member and comprising:
        a) sealing lips engaging side surfaces and a bottom of said sealing groove,
        b) sealing portions extending outwardly from said sealing groove so as to make sealing contact with the inner peripheral surface when said cap assembly covers the opening,
        c) annular grooves positioned between said sealing lips and said sealing portion such that said sealing portion does not contact the side surfaces of said sealing groove when said sealing member is in an uncompressed state, and
        d) two contacting portions extending from said sealing portions towards the side surfaces of said sealing groove by such a degree that said contacting portions do not contact the side surfaces when said cap assembly is not installed, and such that one of said contacting portions can contact the side surfaces when said cap assembly is installed to close the opening and the sealing portions make sealing contact with the inner peripheral surface.

2. A cap assembly according to claim 1, wherein said annular grooves open axially to radially deflect said contacting portions in response to a sliding motion of said sealing member on the inner surface of said opening.

3. A cap assembly according to claim 2, wherein each axially opened annular groove of said sealing member has a substantially semicircular cross section.

4. A cap assembly according to claim 3, said sealing member is formed symmetrically in the axial direction of said cylindrical member.

5. A cap assembly according to claim 2, wherein said sealing member is formed on the circumferential surface thereof with an annular groove opened radially in the substantially center of said circumferential surface to form one of said sealing portions at each side of said radially opened annular groove on said circumferential surface.

6. A cap assembly according to claim 5, wherein said radially opened annular groove of said sealing member has a substantially semicircular cross section.

7. A cap assembly according to claim 5, wherein said engaging lips are positioned around the inner periphery of said sealing member at both ends thereof.

8. A cap assembly according to claim 7, wherein said cylindrical member has a threaded portion at the end thereof opposite to the end connected to said cap member, said threaded portion threadedly engaging with said opening, and wherein said sealing groove is formed between both ends of said cylindrical member.

9. A cap assembly which may be installed for closing an opening having an inner peripheral surface, comprising:
    a cap member for closing the opening;
    a cylindrical member connected to said cap member for threadedly engaging with said opening, said cylindrical member being formed therearound with a sealing groove opened outwardly and radially; and
    a sealing member disposed in said sealing groove of said cylindrical member and comprising:
        a) sealing lips engaging side surfaces and a bottom of said sealing groove,
        b) sealing portions extending outwardly from said sealing groove so as to make sealing contact with the inner peripheral surface when said cap assembly covers the opening,
        c) annular grooves positioned between said sealing lips and said sealing portion such that said sealing portion does not contact the side surfaces of said sealing groove when said sealing member is in an uncompressed state, and
        d) two contacting portions extending from said sealing portions towards the side surfaces of said sealing groove by such a degree that said contacting portions do not contact the side surfaces when said cap assembly is not installed, and such that one of said contacting portions can contact the side surfaces when said cap assembly is installed to close the opening and the sealing portions make sealing contact with the inner peripheral surface.

* * * * *